United States Patent
Dupoiron

(10) Patent No.: US 7,318,454 B2
(45) Date of Patent: Jan. 15, 2008

(54) FLEXIBLE TUBULAR DUCT FOR THE TRANSPORT OF FLUID AND PARTICULARLY GASEOUS HYDROCARBONS WITH AN ANTI-TURBULENCE CARCASS AND INTERNAL LINING

(75) Inventor: François Dupoiron, Barentin (FR)

(73) Assignee: Technip France (FR)

( * ) Notice: Subject to any disclaimer, the term of this patent is extended or adjusted under 35 U.S.C. 154(b) by 120 days.

(21) Appl. No.: 10/560,575

(22) PCT Filed: Jun. 7, 2004

(86) PCT No.: PCT/FR2004/001412

§ 371 (c)(1),
(2), (4) Date: Jan. 19, 2006

(87) PCT Pub. No.: WO2004/111514

PCT Pub. Date: Dec. 23, 2004

(65) Prior Publication Data

US 2006/0130924 A1 Jun. 22, 2006

(30) Foreign Application Priority Data

Jun. 11, 2003 (FR) ................................. 03 06995

(51) Int. Cl.
*F16L 11/00* (2006.01)
(52) U.S. Cl. .................. 138/135; 138/134; 138/172; 138/37
(58) Field of Classification Search ............ 138/134, 138/135, 172, 37, 39
See application file for complete search history.

(56) References Cited

U.S. PATENT DOCUMENTS

| 3,165,123 | A | | 1/1965 | Hawkins ...................... 138/37 |
| 3,908,788 | A | | 9/1975 | Hammarstedt ................ 181/33 |
| 4,867,205 | A | * | 9/1989 | Bournazel et al. ........... 138/130 |
| 5,172,729 | A | * | 12/1992 | Vantellini ..................... 138/26 |
| 5,176,179 | A | * | 1/1993 | Bournazel et al. ........... 138/130 |
| 5,269,349 | A | * | 12/1993 | Sugier et al. ................ 138/172 |
| 5,307,842 | A | * | 5/1994 | Lequeux ..................... 138/149 |
| 5,813,439 | A | * | 9/1998 | Herrero et al. .............. 138/134 |
| 5,934,335 | A | * | 8/1999 | Hardy ........................ 138/131 |
| 6,006,788 | A | * | 12/1999 | Jung et al. .................. 138/131 |

(Continued)

FOREIGN PATENT DOCUMENTS

EP 0 429 357 5/1991

(Continued)

OTHER PUBLICATIONS

International Search Report PCT/FR2004/001412 dated Dec. 2, 2004.

*Primary Examiner*—Patrick F. Brinson
(74) *Attorney, Agent, or Firm*—Ostrolenk, Faber, Gerb & Soffen, LLP

(57) ABSTRACT

A flexible tubular pipe for transporting hydrocarbons, the pipe comprising at least one carcass, an internal pressure sheath and one or more armor layers. The carcass forms the innermost structural element of the pipe and consists of an interlocked spiral winding of a strip or wire with some shape. The turns of the carcass are internally covered with an anti-turbulence sheath pierced with holes which is intended to oppose turbulence of the hydrocarbon flowing through the pipe and prevent associated resonance phenomena.

7 Claims, 2 Drawing Sheets

U.S. PATENT DOCUMENTS

| | | | |
|---|---|---|---|
| 6,053,213 A * | 4/2000 | Jung et al. | 138/130 |
| 6,098,667 A * | 8/2000 | Odru | 138/134 |
| 6,123,114 A * | 9/2000 | Seguin et al. | 138/124 |
| 6,354,333 B1 * | 3/2002 | Dupoiron et al. | 138/135 |
| 6,363,974 B1 * | 4/2002 | Perez et al. | 138/130 |
| 6,371,414 B1 | 4/2002 | Truax et al. | 244/201 |
| 6,408,891 B1 * | 6/2002 | Jung et al. | 138/127 |
| 6,446,672 B1 * | 9/2002 | Kalman et al. | 138/127 |
| 6,668,866 B2 * | 12/2003 | Glejbol et al. | 138/134 |
| 6,843,278 B2 * | 1/2005 | Espinasse | 138/134 |
| 7,124,780 B2 * | 10/2006 | Dupoiron | 138/134 |
| 2001/0003992 A1 * | 6/2001 | Espinasse | 138/135 |
| 2006/0048833 A1 * | 3/2006 | Glejbol et al. | 138/134 |

FOREIGN PATENT DOCUMENTS

| | | |
|---|---|---|
| FR | 2 543 342 | 9/1984 |
| FR | 2 663 401 | 12/1991 |
| FR | 2 831 238 | 4/2003 |
| RU | 2133905 | 7/1999 |

\* cited by examiner

FLEXIBLE TUBULAR DUCT FOR THE TRANSPORT OF FLUID AND PARTICULARLY GASEOUS HYDROCARBONS WITH AN ANTI-TURBULENCE CARCASS AND INTERNAL LINING

CROSS REFERENCE TO RELATED APPLICATION

The present application is a 35 U.S.C. § § 371 national phase conversion of PCT/FR2004/001412, filed 7 Jun. 2004, which claims priority of French Application No. 03/06995, filed 11 June 2003. The PCT International Application was published in the French language.

The present invention relates to a flexible tubular pipe or duct of the unbonded type for transporting fluid and used in the field of offshore oil production. It relates more particularly to an improvement to pipes of the "rough bore" type (the internal bore of which is not smooth) which are intended for the production or transport of hydrocarbons, particularly gaseous hydrocarbons.

BACKGROUND OF THE INVENTION

The flexible pipes in most widespread use in oil mining are generally of the unbonded type in which the various successive and distinct layers have a certain freedom to move relative to one another and comprise, from the inside outward, a carcass consisting for example of an interlocked metal strip which serves to prevent the pipe from collapsing under external pressure, an internal sealing sheath made of polymer, a pressure vault consisting of at least one interlocked shaped wire wound in a spiral with a short pitch, armor layers known as tensile armor layers the lay angle of which, measured with respect to the longitudinal axis of the pipe, is less than 550°, and an external sealing sheath made of polymer. Such a flexible pipe is known as a rough bore pipe, the innermost element of which consists of a carcass that forms a rough bore, because of the discontinuities between the turns of the carcass.

When a flexible pipe comprises, from the inside outward, an internal polymer sealing sheath, a pressure vault consisting of shaped wires wound with a short pitch and intended to withstand the radial stresses caused by the flow of effluent along the flexible pipe, an anti-collapse sheath, one or more tensile and pressure armor layers wound around the anti-collapse sheath and a polymer external sealing sheath; it is known as a smooth bore because the innermost element is a smooth-walled sealed sheath.

In a variant, the flexible pipe has no pressure vault and the armor layers are spiral-wound in opposite directions with lay angles of around 55°. In this case, the internal and external pressures and the tensile forces also are exerted on or countered by these armor layers; such a flexible pipe is said to be balanced.

Smooth bore pipes are used to convey fluids that have no gaseous phase (and therefore mainly for water injection pipes); this is because, in the case of two-phase fluids, the diffusion, as it flows, of the gases through the internal polymer sealing sheath causes an increase in the pressure in the annulus around the internal sheath. When the pressure in the annulus becomes higher than the internal pressure in the pipe, for example during a decompression following a shutdown, the pressure difference may cause the internal polymer sealing sheath to collapse on itself. It is, amongst other things, in order to counter this risk that it is preferable in this case to have an anti-collapse carcass in the internal polymer sheath and therefore to use a rough bore pipe.

As recalled by the American Petroleum Institute standard API 17J, the carcass is a tubular layer, theoretically internal, formed of an interlocked metal winding and essentially intended to prevent the internal sealing sheath or the pipe from becoming crushed or collapsing under the effect of the external pressure when there is no internal pressure inside the pipe.

The carcass is most traditionally made of corrosion-resistant strip, generally shaped with a cross section similar to a couched "S" and wound in such a way as to produce turns that interlock with one another. In order to improve the performance of a carcass, various proposals have already been made. Reference may thus be made to document EP 0 429 357 by the Applicant company, which discloses a carcass in which the constituent strip comprises a wave-shaped part forming a bearing structure that increases the height of the cross section and therefore the second moment of area, thus improving the crushing strength of the carcass.

Carcasses made of shaped spiral-wound wire also exist in the prior art.

In application FR 01 13 748, the Applicant company has also proposed a hybrid carcass consisting of a winding with at least one elongate metal element such as a wire interlocked with a strip.

In all the cases considered and for which the invention is intended, the carcass therefore comprises, at least partially, a spiral-wound shaped wire or strip.

A problem has arisen with flexible pipes for producing and exporting gaseous hydrocarbons. This problem is associated with the flow of the gas in the rough bore pipe and more specifically with the phenomena of the formation of vortices which occur upon contact with the discontinuities between the turns of the carcass. What happens is that the surface discontinuity encountered at these discontinuities leads to the formation of vortices (and hence to vortex shedding) which disturbs the flow of the gas through the pipe. These vortices give rise to cyclic pressure variations which may lead to problems with resonance (vibration, noise) in the pipe and at the equipment and pipework on the platform (or the FPSO for "Floating production storage and offloading") generally known as topsides, and also in submerged equipment. These pressure fluctuations and especially the resulting vibration may become very substantial and lead to problems of fatigue, particularly in said equipment and at the ends of the pipes which are then stressed more heavily than they were designed for. These problems may give rise to numerous undesirable phenomena such as, for example, leaks at the equipment and pipework connected to the pipe, as a result of fatigue.

One solution to these problems might be to alter the settings on the equipment of the platform or of the well, thus altering the conditions of use of the pipes in order to avoid these phenomena of resonance (reducing the pressure, the flow rate, etc.). However, while these changes to the conditions of use of the pipe allow the effects of these vortices to be reduced thereby reducing the problems of resonance, they do not allow the use of the pipe to be optimized nor do they truly solve the problem presented by these vortices.

Another problem that is noticed is that of the pressure drop in the flow of liquid or gas in rough bore pipes as a result of the turbulence created at the discontinuities.

The object of the invention is to find a solution to these problems of vortices and to propose a pipe of the rough bore structural type that allows gases to flow without exhibiting this detrimental turbulence or the associated resonance phenomena.

SUMMARY OF THE INVENTION

This objective is achieved according to the invention by virtue of a flexible tubular pipe for transporting fluids, particularly gaseous hydrocarbons, the pipe being of the unbonded type and comprising at least a carcass, a polymer internal sealing sheath providing sealing for the transported fluid and one or more armor layers and in which the carcass, situated inside the internal sealing sheath consists of the interlocked spiral winding of a profiled element, characterized in that the turns of the carcass are internally covered with a sheath pierced with holes that is intended to oppose turbulence of the fluid flowing in the pipe. The sheath makes it possible to hide the discontinuities and therefore oppose turbulence and its effects, both in turns of pressure drops and in turns of induced vibration. The holes in the sheath make it possible to avoid the aforementioned problems of the antiturbulence sheath collapsing (such as in the event of a shutdown for example). Furthermore, for this purpose, the holes in the pierced sheath are partially (preferably at least 30% of them) located at the internal discontinuities between the turns.

It is advantageous for the pierced sheath to collapse partially at the internal discontinuities between the turns so as to encourage the antiturbulence sheath to catch mechanically on the carcass in the longitudinal direction, something which is desirable in particular when the pipe is being used as a riser. Such a partial collapse may be obtained at the time of manufacture, for example if the antiturbulence sheath is obtained in the form of an expanding sheath positioned inside the carcass and expanded to the internal diameter of the carcass using known lining techniques.

Advantageously, the holes in the pierced sheath, of which there are a great many, are oblong. Their mean diameter (related statistically to circular holes) is between 1 and 8 mm, for example 5 mm. They are positioned longitudinally in an offset manner, for example in a spiral. As a preference, the holes are positioned with a spacing of between 5 and 100 mm, for example every 20 mm.

Other advantages and characteristics will be brought to light upon reading the description which follows, with reference to the attached schematic drawings in which:

DESCRIPTION OF A PREFERRED EMBODIMENT

Figure 1:
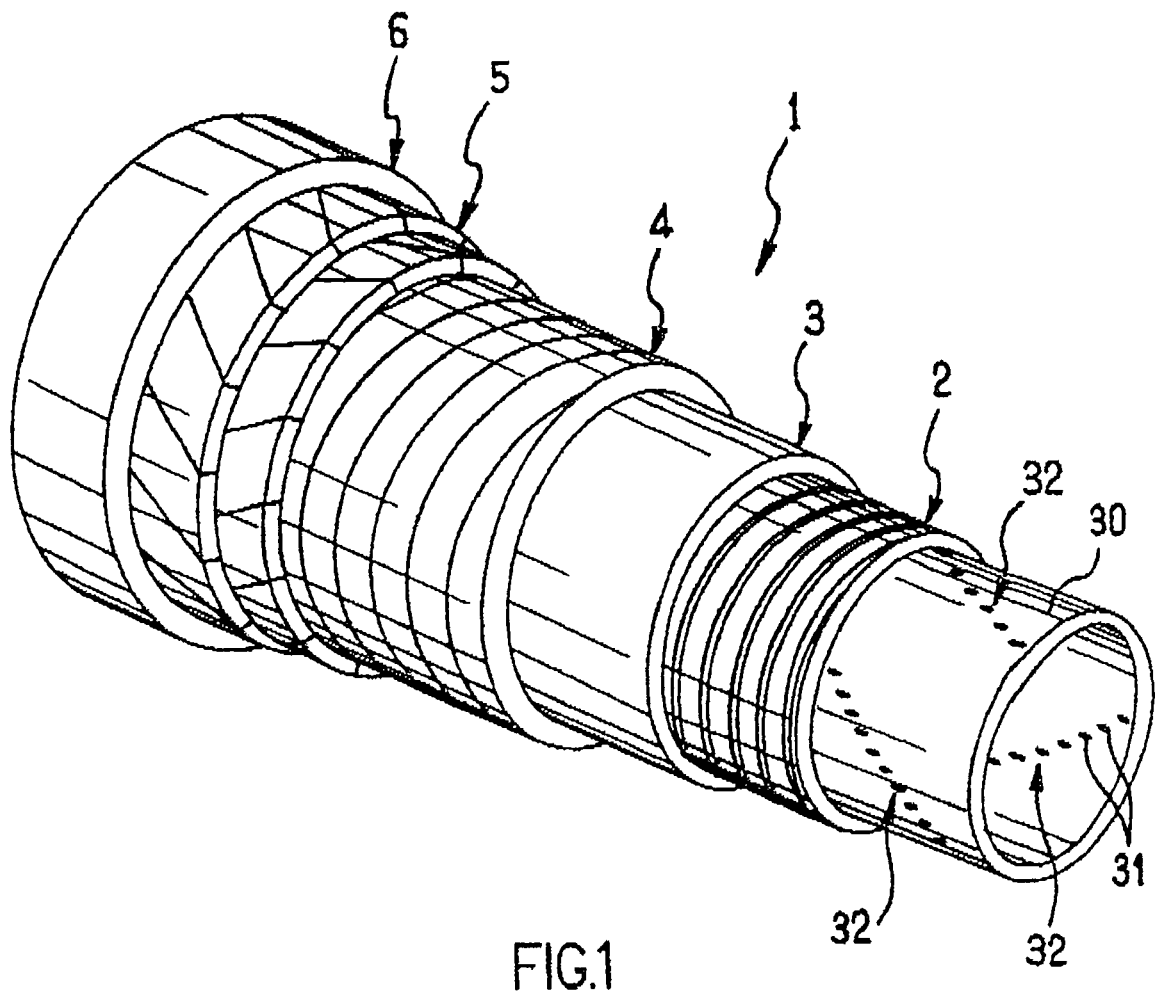
FIG. 1 is a perspective view of a pipe of the rough bore type to which the invention applies.

The flexible pipe 1 depicted in FIG. 1 comprises, from the inside outward:

a carcass 2 consisting of an interlocked metal winding which serves to prevent the pipe from collapsing under the external pressure, an internal sealing pressure sheath 3, made of plastic, generally polymer, resistant to the chemical action of the fluid that is to be transported, a pressure vault 4 that mainly resists the pressure developed by the fluid in the pressure sheath and consists of the short-pitch (that is to say with a winding angle of about 90°) helical winding about the internal sheath, of one or more interlocking metal wires (which may or may not self-interlock); the shaped wires having a cross section in the shape of a Z or a T or any derivative (teta or zeta) thereof, of a U or of an I, at least one layer 5 (and generally at least two crossed layers) of tensile armor wound with a long pitch; the lay angle measured against the longitudinal axis of the pipe is, for example, roughly equal to 55°, and a protective external sealing sheath 6 made of polymer.

The pressure vault, essentially intended to withstand the internal pressure, is not needed in all situations and, given the additional cost burden that it represents, it is preferable to use a pipe without a pressure vault wherever circumstances so permit. The invention applies equally to either scenario.

It additionally comprises the antiturbulence sheath 30 which will be described better further on.

Figure 2:
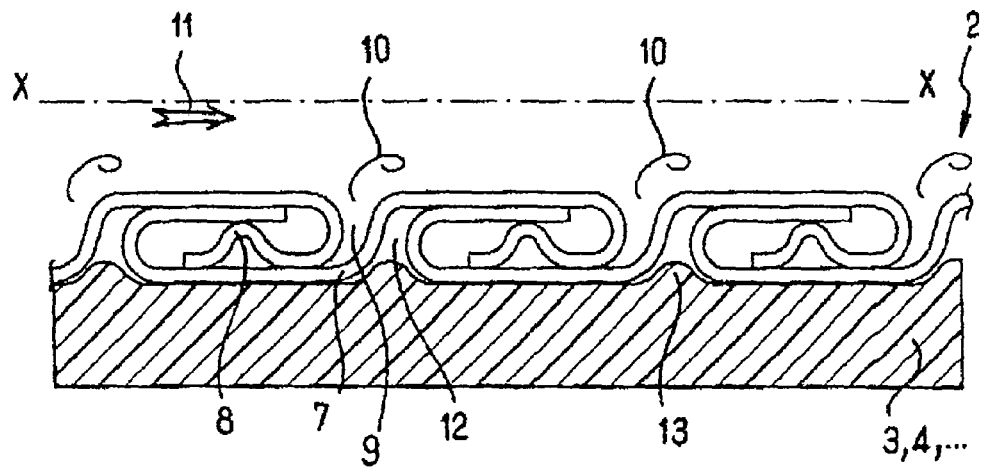
FIG. 2 is an enlarged schematic view of a longitudinal section of carcass of the prior art, produced by winding an S-shaped strip.

FIG. 2 shows the construction of a carcass 2 known from document EP 0 429 357, produced from the helical winding about an axis XX of a strip 7 shaped into a flattened S, provided with a wave shaped bearing part 8. The internal discontinuities 9 that appear between the adjacent turns form a closed well and are the cause of vortices represented symbolically by the lines 10 in the flow of gaseous fluid through the pipe, the overall flow of which is depicted symbolically in the form of the arrow 11. The external discontinuities 12 are plugged by the plastic layer of the sheath 3 which surrounds the carcass and creeps slightly into the discontinuities 11, thereby forming indentations 13.

Figure 3:
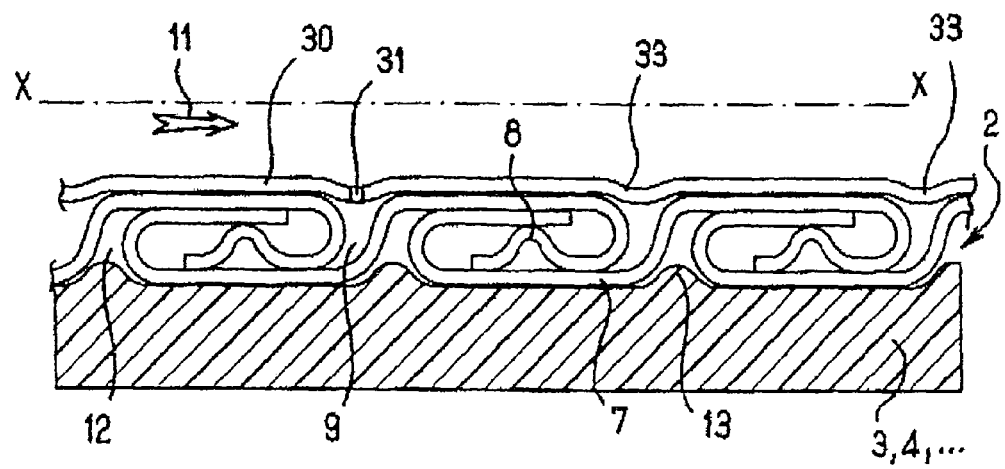
FIG. 3 is an enlarged schematic view of a longitudinal section of carcass according to one embodiment of the invention.

According to the invention, illustrated in FIGS. 1 and 3, the carcass 2 is internally covered by an antiturbulence sheath 30 advantageously arranged in such a way as to form slight depressions 33 at the internal discontinuities 9. The sheath 30 is provided with numerous holes 31, for example three holes 31 about 5 mm in diameter every 10 mm offset by 120°, the next series being offset by 10° to prevent any accumulation of aerodynamic disturbances such that three spirals 32 of holes 31 are formed, at least a substantial proportion (preferably at least 30%) of which will lie over the discontinuities 9 so as to prevent the antiturbulence sheath from collapsing when the inside of the pipe is decompressed.

Of course, these numerical examples, and the shape, number and dimensions of the holes can vary according to each application and are not in any way limiting. Indeed, the thickness of the sheath, the pressure and the nature of the fluid transported are, for example, just three factors which are liable to modify the arrangement of the holes in the antiturbulence sheath.

Naturally, the antiturbulence sheath 30 of the invention, aside from attenuating the induced vibrations, is also effective in reducing pressure drops in the flow by eliminating turbulence at the discontinuities: this reduction in pressure drop largely compensates for the loss caused by the reduction in bore diameter as a result of the presence of the sheath 30 inside the carcass 2.

The sheath 30 is made of polymer and may be reinforced with fiber or with a latticework so as to increase its crushing strength. The increase in this crushing strength may in particular make it possible to reduce the number of holes by increasing the separation which may then be extended from 100 mm to several meters.

It may also be noted that it could be advantageous to use an antiturbulence sheath comprising several external grooves connecting several holes to one another. This would then encourage the return of gases to inside the antiturbulence sheath in the event of decompression.

The invention claimed is:

1. A flexible tubular pipe for transporting fluids, the pipe being of the unbonded type and comprising from inside outward at least a carcass, a polymer internal sealing sheath operative to provide sealing for the transported fluid and one or more armor layers, the carcass, being situated inside the internal sealing sheath, the carcass comprising an interlocked spiral winding of a profiled element, the winding comprising turns of the carcass, and the turns of the carcass form internal discontinuities between successive turns, an anti-turbulence sheath internally covering the turns of the winding, the anti-turbulence sheath being pierced with holes that are intended to oppose turbulence of fluid flowing in the pipe, the anti-turbulence sheath is positioned such that the holes in the pierced anti-turbulence sheath are situated partially at internal discontinuities between the turns such that the holes prevent the antiturbulence sheath from collapsing if the interior of the pipe is decompressed.

2. The pipe as claimed in claim 1, wherein at least 30% of the holes are partially situated at the internal discontinuities between the turns.

3. The pipe as claimed in claim 1, wherein the pierced sheath partially collapses at the internal discontinuities between the turns.

4. The pipe as claimed in claim 1, wherein the holes are oblong in shape.

5. The pipe as claimed in claim 1, wherein the holes have a mean diameter of between 1 and 8 mm.

6. The pipe as claimed in claim 1, wherein the holes are positioned longitudinally in an offset manner along the anti-turbulence sheath and the pipe.

7. The pipe as claimed in claim 1, wherein the holes are positioned with a spacing of between 5 and 100 mm.

\* \* \* \* \*